May 27, 1930. J. B. WEAVER Re. 17,681

PROCESS FOR TREATING HYDROCARBON OILS

Original Filed June 15, 1925

Inventor
Joseph B. Weaver

By W. S. McDowell.
Attorney

Reissued May 27, 1930 Re. 17,681

UNITED STATES PATENT OFFICE

JOSEPH B. WEAVER, OF TOLEDO, OHIO, ASSIGNOR, BY MESNE ASSIGNMENTS, TO GYRO PROCESS COMPANY, A CORPORATION OF MICHIGAN

PROCESS FOR TREATING HYDROCARBON OILS

Original No. 1,601,786, dated October 5, 1926, Serial No. 37,244, filed June 15, 1925. Application for reissue filed June 6, 1927. Serial No. 196,977.

This invention relates to process for treating hydrocarbon oils and relates more particularly to an improved process for the production of low boiling point hydrocarbons suitable for use as motor fuel or the like. The process, however, in certain of its aspects is not limited to the particular use mentioned as certain steps of the process have more general application.

Among the objects of the invention are: to provide an improved process for treating hydrocarbon oils in the vapor phase; to provide a process wherein the detrimental deposit of carbon is avoided; to provide a process in which such carbon as is necessarily formed will be precipitated at a predetermined part in the process and can be readily removed; to provide a process in which the carbon is eliminated by the same step that is used for preheating and dehydrating the make-up stock and in general to provide an improved process for treating hydrocarbon oils, particularly in the vapor phase.

The invention further resides in the use of the above-mentioned features in connection with a process which involves the use of steam and a suitable agent (which term is intended to cover either a catalytic agent or a chemical reagent) and in such other steps and combinations of steps as will more fully hereinafter appear.

In the drawings:—

Figure 1:
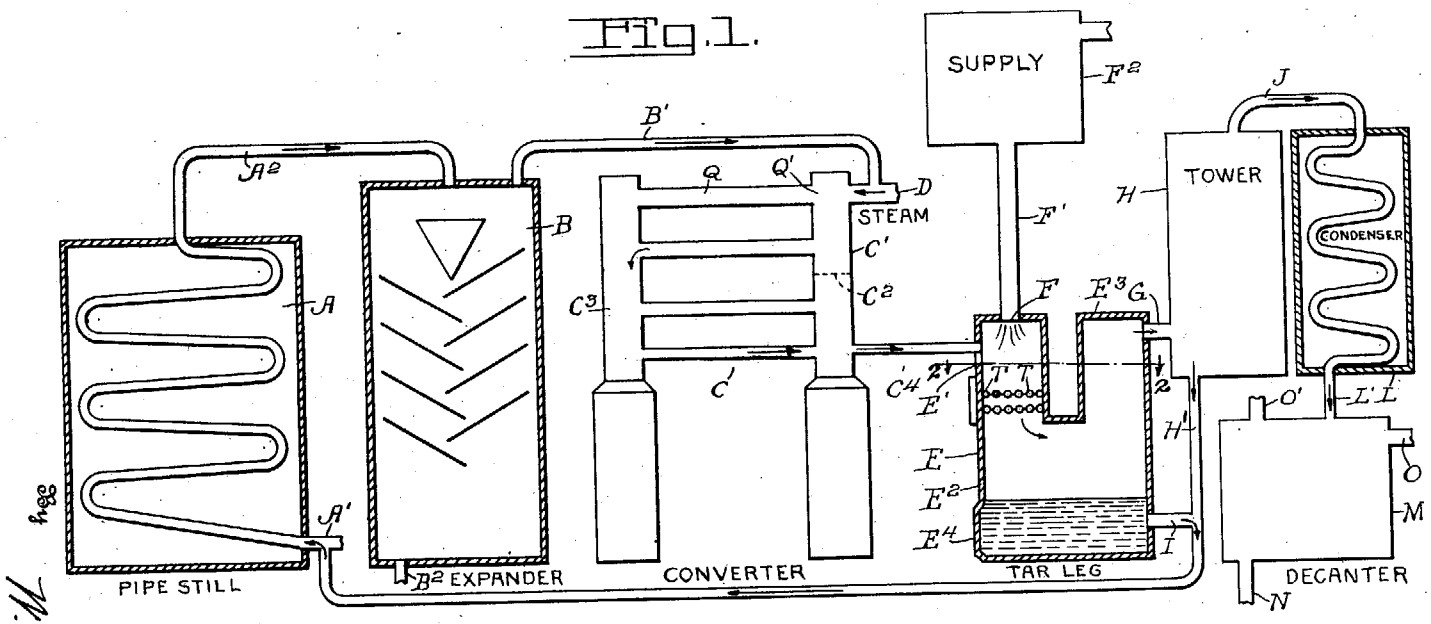
Figure 1 is a diagrammatic view, of an apparatus embodying my invention.
Figure 2:
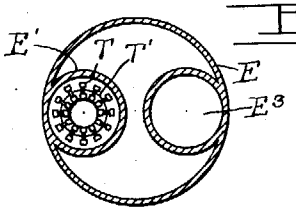
Figure 2 is a horizontal sectional view through the jet condenser or tar leg taken on the plane indicated by the line 2—2 of Figure 1.

In the drawings which illustrate diagrammatically an apparatus by which my improved process may be carried out, A designates a pipe still having an inlet A′ and an outlet $A^2$ leading to an expander or expanding chamber B. The latter at its upper end is connected by the pipes B′ to the inlet end of the convertor C and at its lower end the expander has a pipe $B^2$ through which the heavy residue or liquid hydrocarbons may be drawn off. Interposed in the pipe or line B′ just before it reaches the convertor is a steam inlet D through which steam under pressure is forced, together with the vapors in the pipe B′, into the convertor. The outlet end of the convertor C is connected with a jet condenser or tar leg E. At the upper end the jet condenser is provided with a nozzle F to which the make-up stock is conducted through a pipe F′ from the tank $F^2$. In its upper portion the jet condenser E has a pipe G leading to a fractionating or scrubbing tower H while at its lower end the jet condenser or tar leg E is provided with a conduit I running back to the inlet end A′ of the pipe still A. The tower H also has at its lower end a conduit H′ connecting with the conduit I, and at its upper end the tower H is provided with a pipe J leading to a condenser L. The lower end of the latter is connected by a pipe L′ to a decanter M. As the product from the condenser L contains both water and hydrocarbon in liquid form and a fixed gas, the decanter is arranged to separate these in the following manner: At the lower end of the decanter there is a water leg pipe N for conducting away the condensed water and near the upper end a pipe O for conducting away the resultant hydrocarbon oil product. The fixed gas is conducted off through the pipe O′.

While the construction of the convertor forms the subject matter of a separate application Serial No. 37,245, filed June 15, 1925, its construction in general as shown in Fig. 1 is as follows: The pipe B′ which conducts the vapors from the expander B opens into the header C′ of the convertor. This header is divided into upper and lower sections by the wall $C^2$ and is connected to a similar header $C^3$ by means of pipes Q. The incoming vapors pass through the upper set of pipes Q to the header $C^3$ and back through the lower pipes Q to the lower portion of the header C′ from which they pass through the outlet $C^4$ to the jet condenser or tar leg E. The openings Q′ in the end of the pipes Q are made progressively smaller from the top toward the bottom so that the rate of flow through the top tubes is less than through the bottom tubes. This results in the contents of the upper tubes being subjected to the heat for a longer time than the contents of the lower tubes and will equalize the heating effect due to the lower tubes being subjected to the higher heat. Other means may be employed to accomplish this, for example, the cores of the agent may be made in various cross-sections to limit the flow and produce the same result.

Figure 3:
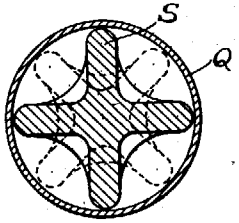
Figure 3 is a cross-sectional view through one of the pipes of the convertor.

As shown in Fig. 3, the convertor tubes Q are filled with the agent. This may be ferric oxid or other suitable substance and I have provided a novel arrangement for mounting and supporting the same within the tubes. The ferric oxid or other agent is mixed in a plastic and formed in bars S which are substantially star-shaped in cross-section. The bars are preferably of less length than the tubes Q and each bar is offset as shown in Fig. 3 so as to cause the vapors to more completely impinge against the agent. This arrangement of the bars S not only presents a large surface of the ferric oxid or other agent for the vapors to impinge against but it also increases the life of the tubes Q. By constructing the bars in the form of a star in cross-section there are only two points of contact between the bars and the tube. Moreover, the vapors in place of passing through the agent, pass between the latter and the inner walls of the convertor tubes Q and absorb the heat directly from the walls. The bars are formed by mixing the ferric oxid with a suitable plastic which is then forced or extruded through a suitable die to give it the proper cross-sectional form.

Describing next in detail the jet condenser or tar leg E, the construction of the latter is as follows: The vapors passing from the convertor C are discharged into the chamber E′ of the jet condenser or tar leg E. At the upper end of this chamber is arranged the nozzle F which is adapted to spray the liquid make-up stock and commingle it with the vapors. This commingling is further assisted by the placing of metal jackstones T through which the commingled convertor vapors and make-up stock pass down to the chamber $E^2$ before reaching the discharge chamber $E^3$ from which the vapors pass through the pipe G to the fractionator or scrubbing tower H. In order to facilitate the cleaning of the jackstones T, a novel arrangement is provided. They are formed separately in order to give a large exposed area but are mounted in rings or groups by stringing a plurality of the separate elements or jackstones on a wire T′. In this manner the jackstones can be removed rapidly for cleaning whenever it is found necessary. The operation of the jet condenser or tar leg E is best described in connection with the following process although it is to be understood that while its use is peculiarly adapted to such process the invention in certain of its broader aspects is not limited to such use, and the process and various steps of the process can be carried out in any suitable apparatus.

In this process the hydrocarbon to be treated is passed through the inlet A′ to the pipe still A where it is raised to a temperature of approximately 700° F., which, however, may be varied according to the characteristics of the charging stock.

The heated oils then pass through the outlet pipe $A^2$ under some pressure, for example, 25 pounds per square inch where they are discharged into the expander B. Owing to the sudden release of the pressure, complete vaporization of the lighter ends takes place and the vapors pass through the pipe B′ at approximately 600° F. to the inlet end of the convertor C. The heavy ends are drawn off through the pipe $B^2$, any desired gravity being obtained by regulating the degree of heating in the pipe still and the pressure in the expander. Just before reaching the convertor the vapors are commingled with steam under pressure and the combined oil vapors and steam vapors are then subjected to the action of the agent in the convertor under temperature of about 1100° F. and are caused to take up a certain percentage of hydrogen from the steam.

In cooling the vapors down from the high temperature of the convertor to the desired temperature for the fractionating tower and condenser, difficulty is encountered in preventing the apparatus from being rendered inoperative by carbon deposits. I have discovered that most of the carbon is deposited in cooling down from the convertor temperature of 1100° F. to a temperature of about 600° F. and that on lowering the temperature below that point there is very little carbon deposit. This discovery is utilized in providing an additional stop in the process whereby the vapors coming from the convertor are caused to commingle in the tar leg E with the make-up stock from the tank $F^2$. In so doing, the vapors are cooled to a temperature of approximately 450° F. and the carbon is deposited in the liquid in the lower portion of the tar leg chamber $E^2$. The carbon being deposited in the liquid can be conveniently removed at predetermined times when the liquid in the bottom of the tar leg $E^2$ becomes too thick. A clean-out door $E^4$ is provided in the tar leg for this purpose. In practice, it is found that it is not necessary to remove this liquid more than once in 48 hours.

It is to be noted that this tar leg E is located so as to receive the converted vapors direct from the convertor without the intervention of any mechanism other than a short length of pipe necessary to connect the convertor and tar leg. In practice this short length of pipe, shown in the drawings as connecting the convertor and tar leg, is preferably heat insulated so as to reduce to a minimum any intermediate cooling. Thus in carrying out my improved process with the apparatus shown in the drawing, the products of conversion are not only rapidly cooled by being commingled with the make-up stock from the nozzle F, but this rapid cooling takes place immediately upon completing the conversion in the vapor phase. Not only does the sudden or immediate lowering of the temperatures of the vapors leaving the convertor result in confining the deposition of free carbon, incident to the conversion, to the limits of the tar leg E, but the operation when carefully carried out results in immediately arresting the conversion reactions so as to practically prevent the further liberation of such free carbon. By this operating principle I have provided a vapor phase system of heat treating hydrocarbon oils wherein a commercial system of this nature is provided which may be operated continuously for an indefinite period of time without stoppage, in so far as the formation or deposition of free carbon is concerned in the apparatus following the convertor.

Prior to my invention the formation of free carbon, particularly in the initial passages of the fractionating apparatus has been a source of very considerable trouble and has required the frequent shutting down of the system in order to remove the carbon from the tubes or passages choked or clogged with the same. Through the use of the present invention this trouble has (for all practical purposes) been definitely eliminated, and the continuous operation for indefinite periods of time assured. From a standpoint of practical commercial operation this discovery has been of great importance, especially in vapor phase cracking systems where relatively high temperatures are utilized during conversion.

The use of the make-up stock in the jet condenser for cooling the vapors from the convertor performs another important function, namely, it permits the jet condenser to act as a topper or stripper for removing the gasoline content from the fresh stock of hydrocarbon oil and also serves to dehydrate the make-up stock before it passes through the pipe I to the inlet end A′ of the still. It also permits of a control of the end point of the vapors delivered to the fractionating tower, to which tower the vapors pass from the jet condenser through the pipe G. The fractionating tower H may be of any well-known construction and in some instances a scrubbing tower may be substituted in place of the fractionating tower. Such vapors as will vaporize at the desired temperature, for example, at approximately 437° F. or less, pass out of the fractionating or scrubbing tower H through the pipe J to the condenser L while higher boiling point fractions are returned through the pipe H′ and the pipe I to the still A for the purpose of further treatment. The oil and water vapors are then condensed in the usual manner in the condenser L and separated as previously described in the decanter M.

While I have shown and described the process in connection with an apparatus, I do not desire to limit the process to use in connection with any particular apparatus nor to the temperatures or combinations of steps in the process except as ultimately set forth in the claims. Also, while I have shown and described the use of hydrocarbon oil in the jet condenser, water or other liquid might be employed and other means of cooling than a jet condenser might be employed.

What is claimed is:

1. The process of treating hydrocarbon oil which comprises vaporizing the oil, then while the oil is in the vapor phase converting the oil at a temperature in excess of approximately 1000° F., and immediately upon completing the conversion in the vapor phase rapidly cooling the products of conversion to a critical temperature less than approximately 600° F., above which critical temperature the cooling will produce a deposit of substantially all the carbon that will be formed in cooling, collecting the carbon so formed in a manner suitable for convenient removal and then continuing the further treatment of the products of conversion at a temperature sufficiently low to produce no further substantial carbon deposit.

2. The process of treating hydrocarbon oil which comprises vaporizing the oil, then while the oil is in the vapor phase and in the presence of a metal oxid converting the oil at a temperature in excess of approximately 1000° F., and immediately upon completing the conversion in the vapor phase rapidly cooling the products of conversion to a critical temperature less than approximately 600° F., above which critical temperature the cooling will produce a deposit of substantially all the carbon that will be formed in cooling, collecting the carbon so formed in a manner suitable for convenient removal, and then continuing the further treatment of the products of conversion at a temperature sufficiently low to produce no further substantial carbon deposit.

3. The process of treating hydrocarbon oil which comprises vaporizing the oil, then while the oil is in the vapor phase and while in the presence of a metal oxid and steam converting the oil at a temperature in excess of approximately 1000° F., and immediately upon completing the conversion in the vapor phase rapidly cooling the products of conversion to a critical temperature less than approximately 600° F., above which critical temperature the cooling will produce a deposit of substantially all the carbon that will be formed in cooling, collecting the carbon so formed in a manner suitable for convenient removal, and then continuing the further treatment of the products of conversion at a temperature sufficiently low to produce no further substantial carbon deposit.

4. The process of treating hydrocarbon oil which comprises vaporizing the oil, then while the oil is in the vapor phase, converting the oil at a temperature in excess of approximately 1000° F. and immediately upon completing the conversion in the vapor phase commingling the products of conversion with liquid hydrocarbon oil of sufficiently low temperature to rapidly cool the conversion products to a critical temperature less than approximately 600° F., above which critical temperature the cooling will produce a deposit of substantially all the carbon that will be formed in cooling, collecting the carbon so formed in a manner suitable for convenient removal, and then continuing the further treatment of the products of conversion at a temperature sufficiently low to produce no further substantial carbon deposit.

5. The process of treating hydrocarbon oil which comprises converting the oil in the vapor phase at a temperature in excess of approximately 1000° F., and immediately upon completing the conversion in the vapor phase abruptly arresting the conversion reaction by effecting a rapid and substantially instantaneous cooling of the products of conversion to a critical temperature less than approximately 600° F., and then continuing the further treatment of the products of conversion at temperatures sufficiently low to produce no further carbon deposit.

6. The process of treating hydrocarbon oil, which comprises subjecting the oil while in the vapor phase to temperatures in excess of approximately 1000° F., and immediately upon completing the conversion in the vapor phase abruptly arresting the conversion reactions by instantaneously cooling the products of conversion to a critical temperature less than approximately 600° F. to substantially eliminate the formation of free carbon following the conversion of the oil.

7. The process of treating hydrocarbon oil, which comprises vaporizing the oil, then while the same is in the vapor phase converting the oil at a temperature in excess of approximately 1000° F., and immediately upon completing the conversion in the vapor phase arresting the conversion reactions by effecting a rapid and substantially instantaneous cooling of the products of conversion to a critical temperature less than approximately 600° F. to thereby eliminate substantially the formation of free carbon following conversion of the oil, and then continuing the further treatment of the products of conversion at temperatures sufficiently low to produce no further substantial carbon deposit.

8. The process of treating hydrocarbon oil, which comprises vaporizing the oil, then while the oil is in the vapor phase converting the oil at a temperature in excess of approximately 1000° F., and immediately upon completing the conversion in the vapor phase arresting the conversion reactions set up by effecting a rapid and substantially instantaneous cooling of the products of conversion to a critical temperature less than approximately 600° F., and then continuing the further treatment of the products of conversion at temperatures less than approximately 600° F.

9. The process of heat treating hydrocarbon oil, which comprises vaporizing the oil, then while the oil is in the vapor phase subjecting the same to conversion temperatures in excess of approximately 1000° F. for a period of time necessary merely to secure desired conversion and in then upon completing the conversion in the vapor phase immediately arresting the conversion reactions by effecting a rapid and substantially instantaneous cooling of the products of conversion to critical temperatures less than approximately 600° F., said rapid cooling of the vapors serving to substantially eliminate the formation of free carbon in the further handling of the oil vapors.

10. The process of treating hydrocarbon oil which comprises vaporizing the oil then while the oil is in the vapor phase and in the presence of a metal oxide converting the oil at a temperature in excess of approximately 1000° F., and immediately upon completing the conversion in the vapor phase arresting the conversion reactions by effecting a rapid cooling of the products of conversion to a critical temperature less than approximately 600° F. to eliminate the liberation of free carbon from said converted products and then continuing the further treatment of the products of conversion at temperatures not higher than said critical temperatures.

11. The process of treating hydrocarbon oil, which comprises vaporizing the oil, then while the oil is in the vapor phase and while in the presence of a metal oxide and steam converting the oil at a temperature in excess of approximately 1000° F., and immediately upon completing the conversion in the vapor phase arresting the conversion reactions by effecting a rapid cooling of the products of conversion to a critical temperature less than approximately 600° F. to eliminate the liberation of free carbon from said converted products, and then continuing the further treatment of the products of conversion at temperatures not higher than said critical temperatures.

12. The process of treating hydrocarbon oil, which comprises vaporizing the oil, then while the oil is in the vapor phase converting the oil at a temperature in excess of approximately 1000° F., and immediately upon completing the conversion in the vapor phase arresting the conversion reactions by effecting a rapid cooling of the products of conversion to critical temperatures less than approximately 600° F., said rapid cooling being effected by commingling the products of conversion with liquid hydrocarbon oil of sufficiently low temperature in such manner as to effect a substantially instantaneous reduction in the temperature range specified, and then continuing the further treatment of the products of conversion at a temperature sufficiently low to prevent the liberation of free carbon.

13. In the conversion of hydrocarbons by subjecting the vapors thereof to converting temperatures in excess of 1000° F. in a heating zone, the step of terminating the conversion reactions with minimum liberation of free carbon which consists in effecting a substantially instantaneous cooling of the products of conversion to a temperature not substantially in excess of 600° F. by bringing said products of conversion into direct contact with a cooling fluid immediately upon leaving the heating zone.

14. In the conversion of hydrocarbons by subjecting the vapors thereof to converting temperatures in excess of 1000° F. in a heating zone, the step of terminating the conversion reactions with minimum liberation of free carbon which consists in effecting an instantaneous cooling of the products of conversion to a temperature below 600° F. by bringing the products of conversion into intimate contact with a body of cooling oil immediately upon leaving the heating zone.

15. In the conversion of hydrocarbons, the process which consists in subjecting a moving body of oil vapor to a temperature in excess of 1000° F. to produce cracking reactions therein, and immediately upon completing the cracking, quenching the cracking reactions with minimum formation of free carbon by bringing said vapors when at such cracking temperature into direct contact with quantities of relatively cool oil whereby to instantly lower the temperature of said converter vapors to a non-converting temperature not substantially in excess of 600° F., removing the vapors present which do not liquefy at a temperature of substantially 600° F. and separately passing remaining liquids through a vaporizer and utilizing the vapors therefrom as a cracking stock.

In testimony whereof I affix my signature.

JOSEPH B. WEAVER.